UNITED STATES PATENT OFFICE.

ALBERT DECATUR BARR, OF JERSEY CITY, NEW JERSEY.

PROCESS OF PRODUCING MEDICAMENTS.

966,786.     Specification of Letters Patent.     Patented Aug. 9, 1910.

No Drawing.     Application filed December 9, 1908. Serial No. 466,643.

*To all whom it may concern:*

Be it known that I, ALBERT DECATUR BARR, a citizen of the United States, residing at Jersey City, county of Hudson, and State of New Jersey, have invented new and useful Processes of Producing Medicaments, of which the following is a specification.

This invention relates to processes of producing medicaments; and it comprises a stimulating antipyretic crystalline salt comprising as proximate elements an antipyretic derivative of the anilin group of the anilid type, and a vegetable alkaloid of appropriate therapeutic properties, and it also comprises a process of producing such medicament by the treatment of an anilid derivative with an acid, and a subsequent union of a vegetable alkaloid to the body so treated; all as more fully hereinafter set forth and as claimed.

The value of antipyretics as therapeutic agents is well understood, and in particular the antipyretic bodies derived from the anilid group by substitution, as for example, acetanilids are widely known, valuable therapeutic agents. But the fact that they have a heart depressing effect has been an obstacle to their satisfactory use.

The object of the present invention is the conversion of these bodies into new compounds wherein they retain their antipyretic value without the concomitant depressing action upon the heart, having indeed a tonic or stimulating action thereupon as well as possessing sundry other advantages, among which may be mentioned an increase of power to ease pain and produce sleep and a decrease in the objectionable after-effects heretofore resulting from the use of antipyretics. The new compounds being the crystalline products derived from a definite chemical combination, as distinguished from a mere mechanical admixture, such as is ordinarily made in compounding prescriptions, the composition is definite, the ratio between the components being invariably the same. Because of this definite composition the solution and absorption in the stomach and the action in the system are better than can be obtained with the mechanical mixture referred to. And because of the definite composition, administration may be practiced with convenience and accuracy.

Of the antipyretic derivatives of the anilin group, acetanilid is one of the most valuable and I prefer to use an acetanilid in the present embodiment of my invention, though other antipyretic bodies of the anilid type derived from anilin may be employed. Acetanilid contains acetyl, which is an acid group being masked by the amid group. I basic amid group it is rather indifferent chemically. It will however combine with acids but is not usually supposed to enter into combination with basic bodies, such as the alkaloids, the influence of the acid acetyl group being masked by the amid group. I have, however, discovered that by treating acetanilid with sundry of the stronger acids, the resulting product combines readily with the basic vegetable alkaloids, such as quinin. As to the nature of the action which takes place, I am at present unaware and content myself with noting the fact without attempting to explain the theory thereof.

While several other acids, such as hydrochloric or sulfuric acid may be used in the preliminary treatment of the acetanilid, I prefer to use nitric acid.

In a typical embodiment of my present invention, I place an ounce of acetanilid in 4 fluid drams of chemically pure nitric acid (acid containing 68 per cent. absolute acid being suitable). The mixture is allowed to stand until the acetanilid dissolves which requires about half an hour. Water is then added and the product of reaction crystallizes out. The crystals I place on a filter and wash thoroughly with water to remove the excess of the acid employed. I then dissolve the crystals in any suitable neutral solvent, but preferably in alcohol. To this solution I then add quinin until the mixture is so saturated therewith that the reaction appears neutral. About nine and three-quarters parts of quinin are requisite for twenty-five parts of anhydrous acetanilid. This produces a solution of my new medicament. This solution is then evaporated to crystallization. The body obtained is a crystalline, efflorescent, saline substance which on standing in air gradually parts with most of its water or alcohol of crystallization. On drying for three to seven days, the residue is a hard, dry, crystalline salt which is my new medicament. This body contains its components in definite proportions, is stable in air, is insoluble in water, is soluble in about six times its weight of alcohol and has a melting point between 200° F. and 212° F.

In producing the described product I find nitric acid superior to other acids, both because the product ultimately obtained is superior medicinally and because the products formed with hydrochloric and sulfuric acid are somewhat unstable, rendering great care necessary in the next stage of the process.

While other alkaloids may be employed in the same way, as quinin, yielding like compounds, in the present embodiment of my invention I prefer quinin. Using quinin and acetanilid, I obtain a very desirable medicament in which there are conjoined antipyretic effects like those of acetanilid and heart stimulating properties like those of quinin. The medicament being a new chemical compound, of course its properties are not the sum of the properties of its components but its properties are in general like those of its components. Quinin also in the quantity which is necessary to combine with the acetanilid derivative in the described reaction gives a better balance in the medicinal properties of the resulting compound than do other alkaloids of like nature, but of different equivalent weight.

The product obtained upon treating acetanilid with an acid in the manner described has in itself valuable therapeutic properties being, so far as these are concerned rather better than the original acetanilid for the reason that the addition of the acid group tends in the direction of lessening the heart depressing effect of such acetanilid. But it is practically and commercially unavailable to the practitioner because of its lack of stability since it decomposes on losing its water of crystallization and on exposure to air. But by uniting this acid derivative with a vegetable alkaloid in the manner described, a compound is obtained which is perfectly stable and possesses new and valuable properties. In the described combination of the acid derivative with a vegetable alkaloid a new compound is produced which has the physiological effects of stimulating, easing pain and producing sleep. Other vegetable alkaloids, as stated, such as morphin, may be substituted for quinin.

What I claim is:—

1. The process of making a medicament which comprises combining an anilin derivative of the anilid type with a free acid, removing the excess of acid and combining the product with an alkaloid.

2. The process of making a medicament which comprises combining an anilin derivative of the anilid type with a free acid, removing the excess of acid and combining the product with quinin.

3. The process of making a medicament which comprises combining acetanilid with a free acid, removing the excess of acid and combining the product with an alkaloid.

4. The process of making a medicament which comprises combining acetanilid with a free acid, removing the excess of acid and combining the product with quinin.

5. The process of making a medicament which comprises combining acetanilid with nitric acid, removing the excess of acid and combining the product with an alkaloid.

6. The process of making a medicament which comprises combining acetanilid with nitric acid, removing the excess of acid and combining the product with quinin.

7. The process of manufacturing a stimulating antipyretic which consists in dissolving acetanilid in nitric acid, crystallizing, washing, dissolving the crystals, saturating with quinin, and evaporating.

ALBERT DECATUR BARR.

Witnesses:
HERMAN GUSTOW,
KATHRYN M. KILEY.